United States Patent
Lugo et al.

(10) Patent No.: US 7,709,419 B2
(45) Date of Patent: May 4, 2010

(54) METHOD AND THERMODYNAMIC INHIBITORS OF GAS HYDRATES IN WATER-BASED FLUIDS

(75) Inventors: Rafael Lugo, Paris (FR); Christine Dalmazzone, Versailles (FR); Annie Audibert, Croissy sur Seine (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 614 days.

(21) Appl. No.: 11/514,928

(22) Filed: Sep. 5, 2006

(65) Prior Publication Data

US 2007/0054812 A1 Mar. 8, 2007

(30) Foreign Application Priority Data

Sep. 5, 2005 (FR) .................................. 05 09042

(51) Int. Cl.
*C04B 33/04* (2006.01)

(52) U.S. Cl. ........................................ 507/90; 166/310

(58) Field of Classification Search ................. 507/266, 507/276, 762; 166/310
See application file for complete search history.

(56) References Cited

U.S. PATENT DOCUMENTS

| 5,076,364 A | 12/1991 | Hale et al. |
| 5,085,282 A | 2/1992 | Hale et al. |
| 5,972,057 A * | 10/1999 | Hayafuji et al. ............... 44/388 |

FOREIGN PATENT DOCUMENTS

GB 2216574 10/1989

* cited by examiner

*Primary Examiner*—Timothy J. Kugel
*Assistant Examiner*—Atnaf Admasu
(74) *Attorney, Agent, or Firm*—Antonelli, Terry, Stout & Kraus, LLP.

(57) ABSTRACT

The present invention relates to an additive that inhibits formation of gas hydrates for water-based drilling fluid, the additive having at least the following constituents (weight percent):

- a mixture A of glycerol derivatives having 10 to 55% monoglycerol, 15 to 32% diglycerol, and 5 to 12% triglycerol;
- 0 to 10% of at least one carboxylic acid salt,
- 0 to 45% of at least one inorganic salt.

11 Claims, No Drawings

METHOD AND THERMODYNAMIC INHIBITORS OF GAS HYDRATES IN WATER-BASED FLUIDS

The present invention relates to the field of thermodynamic inhibition of gas hydrates that may appear in well fluids, particularly in water-based drilling muds.

The current energy context is pushing the oil industry to exploit available offshore hydrocarbon deposits at deeper and deeper depths and/or in geographic areas (the North Sea, for example) where drilling conditions become extreme in terms of pressure (over 400 bars) and temperature (about 0° C.). Hence, the drilling operation, particularly the drilling fluid, must be adapted accordingly. In general, a distinction may be made between two types of mud: oil-based mud and water-based mud, although in both cases water is present in a varying proportion.

The high pressures, relatively low temperatures, and the presence of water favor formation of gas hydrates within the actual drilling fluid. Gas hydrates are crystalline structures formed by water molecules, forming a cage of sorts which envelopes the more volatile hydrocarbons (mainly methane, ethane, or propane) but also hydrogen sulfide or carbon dioxide. Their formation involves substantial hazards in terms of operating safety. They may cause operations to shut down, entailing major financial loss. It is also important to look at this problem because the oil-based muds, less sensitive to hydrate formation, are frequently an issue because of their effects on the environment, to the benefit of water-based fluids where the risk of hydrate formation is obviously higher.

The following are possible remedies:
changing operating conditions (pressure and temperature, heat insulation, etc.) which proves to be expensive and disruptive of operations;
using specific additives, called inhibitors, preventing or retarding hydrate formation by physical/chemical mechanisms. There are two types of inhibitors: kinetic inhibitors, which act on the kinetics of crystal growth; and thermodynamic inhibitors which cause the formation temperatures and pressures to vary. It appears that the use of kinetic inhibitors in drilling muds has not developed a great deal; on the other hand, thermodynamic inhibitors are often part of drilling fluid formulations.

A thermodynamic inhibitor is a compound able to bind to water through intermolecular bonds, thus preventing bound water molecules from forming hydrogen bonds with each other and with the remaining free water. More specifically, these compounds reduce the free-water concentration, which is called water activity in the system. This being the case, there is an additional barrier to crystal formation, and the appearance of hydrates then requires higher pressures and/or lower temperatures.

In general, one can distinguish between two types of species that can interact efficiently with water: polar molecules, and ionic species (one even speaks of polar bonds and ionic bonds). Methanol is an example of a polar compound well known for its inhibiting effect. Also, sodium chloride, a widely used thermodynamic inhibitor, is a compound whose dissociation in water is followed by solvation of ionic species and reduction in water activity.

One literature survey on thermodynamic inhibitors used in drilling muds, by Ebeltoft et al., is known (H. Ebeltoft, M. Yousif, and E. Soergärd (1997)—Hydrate Control During Deepwater Drilling: Overview and New Drilling-Fluids Formulations, in: SPE ATCE, San Antonio, Tex., Oct. 5-8, 1997, SPE No. 38567). It appears that current practice in the field consists of using salts at fairly high mass concentrations. These are generally sodium chloride at concentrations by weight of 20% to 26%. This salt is generally present in most formulations, but calcium or potassium chloride and sodium bromide are also used. This solution proves to be inadequate for the extreme conditions referred to above. The use of methanol requires high mass concentrations—as high as 50%. Today, it is frequent to find combinations of the polyol/salt type (organic or inorganic) where the polyol is usually a glycol polyalkyl, often ethyl glycol.

Research on the ideal thermodynamic inhibitor is difficult because a large number of combinations have to be tested. One may cite documents FR2820823 and U.S. Pat. No. 0,134,136 in the name of one of the applicants, which describe a fast, efficient method for determining the conditions of hydrate formation in drilling fluids using a calorimetric technique.

Alcohols and polyols are often used to inhibit hydrates that form in oil pipes in general. U.S. Pat. No. 3,348,614 relates to hydrate formation in the natural gas production operation and proposes injecting an additive used to lower the freezing temperature of water, preferably a liquid, such as methanol or a glycol polyalkylene.

For similar additives, one may also cite U.S. Pat. No. 6,080,704, which proposes a thermodynamic inhibitor for water-based drilling muds where the additive is a water-soluble organic compound with a molecular weight less than 800, which compound could be for example a glycol, a polyglycol, an alkylene glycol, a carbohydrate, an amino acid, or a salt of the above compounds. U.S. Pat. No. 6,165,945 describes a drilling fluid in which the thermodynamic hydrate inhibitor is a mixture of ethylene glycol and propylene glycol derivatives, preferably an additive made in a volume ratio of 35% tripropylene glycol and 65% ethylene glycol. EP Patent 0850287, which describes a mud of which the basic compound is glycol, for drilling operations in high-clay formations, may also be cited.

U.S. Pat. No. 5,076,364 proposes a thermodynamic inhibition process and additive, where the latter can be injected with a carrier fluid and circulated at the sea bed (mudline). The additive is an alcohol/inorganic salt mixture, where the alcohol is preferably an organic derivative of glycerol. The salt can be one of the sodium, calcium, or potassium chlorides, or sodium nitrate or bromide. The inhibiting effect of this alcohol/inorganic salt combination appears to be greater than the sum of the individual effects of alcohol and salt (synergistic effect).

Other applications use certain thermodynamic inhibitors to obtain useful properties for drilling or other operations without mentioning their inhibiting effect on hydrate formation. Thus, patent WO-03029612 proposes a method for recovering the hydrocarbons contained in a geological hydrate formation using an aqueous solution containing a mass concentration ranging from 10% to 75% of an organic salt, which salt could be potassium formate or an acetate. Certain additives and/or processes using these compounds and pertaining to the drilling fluid have been patented, although the goal was not thermodynamic inhibition of hydrates. Thus one may cite U.S. Pat. No. 6,818,595 which describes a solid-free drilling mud using at least one alkali metal formate, preferably cesium formate, or a monovalent carboxylic acid salt. The additive is used in the form of an aqueous solution in volume proportions that may range from 35% to 90% of the drilling mud. We will also cite U.S. Pat. No. 6,695,897 which describes a formulation having a corrosion inhibitor and an alkali metal formate. In this group of patents, the formate or acetate salts are used to increase the density of the formulation.

Thus, the present invention relates to an additive that inhibits formation of gas hydrates for water-based drilling fluid, said additive having at least the following constituents (weight percent):
- a mixture A of glycerol derivatives having 10 to 55% monoglycerol, 15 to 32% diglycerol, and 5 to 12% triglycerol;
- 0 to 10% of at least one carboxylic acid salt,
- 0 to 45% of at least one inorganic salt.

Mixture A can have monoglycerol, diglycerol, and triglycerol in the following respective proportions: 12 to 18%, 15 to 20%, about 5%.

Mixture A can have monoglycerol, diglycerol, and triglycerol in the following respective proportions: 50 to 55%, 28 to 32%, and 10 to 12%.

Mixture A can have polyglycerols with molecular weights greater than 372 g/mol at concentrations by weight of less than 5%.

The carboxylic acid salt can be a sodium or potassium salt with a short carbon chain, preferably a formate, an acetate, or a lactate.

The inorganic salt can be a sodium salt, preferably a chloride, a nitrate, or a sulfate.

Mixture A can be an oil-chemistry residue obtained during a food production process.

The invention also relates to a method of inhibiting gas hydrate formation for a water-based drilling fluid, wherein an aqueous solution of additive according to the invention is used.

Thus, an additive or an additive formulation is presented for water-based drilling fluids enabling gas hydrates to be efficiently inhibited. This additive has at least one of the following three compounds and/or mixtures:

1) a polyglycerol mixture, which can contain monoglycerol, diglycerol, triglycerol, and possibly but not necessarily other polyglycerols with molecular weights greater than 372 g/mol at mass concentrations less than 5%;

2) a carboxylic acid salt, preferably a short-carbon-chain sodium or potassium salt, and preferably a formate, an acetate, or a lactate;

3) an inorganic salt, preferably a sodium salt that could be a chloride but also a nitrate or sulfate.

The present invention will be better understood and its advantages will appear more clearly by reading the following non-limiting examples.

One of the goals of the invention is to propose an additive for efficiently inhibiting hydrate formation by changing the theoretical formation temperatures and pressures (thermodynamic inhibition). "Efficiently" here means that an a substantial inhibiting effect is achieved relative to the percentage by weight of additive present in the fluid. Hence, the goal is to "shift" the conditions (in terms of pressure and temperature) under which hydrates exist from the operating conditions. To achieve this, the activity of the water present in the drilling fluid is reduced by using additives comprised of molecules able to bond with water molecules.

Another goal of the invention is to propose a "green" additive that would replace, or very substantially reduce, the quantities of substances with specific drawbacks in regard to offshore drilling. Concerning the substances most widely used at present, we would point out that:

1) chlorides are highly corrosive substances, generating considerable costs due to the use of corrosion inhibitors;

2) the quantities of methanol needed to achieve sufficient inhibition are generally very large (mass fractions as high as 50% in the drilling fluid formulation), which raises safety problems and generates substantial costs;

3) studies seem to show that monoethylene glycol is not itself toxic to aquatic organisms, as its biodegradation in the aquatic medium is fast, without bioaccumulation; nonetheless this substance has a high chemical oxygen demand. This may contribute to oxygen impoverishment in the medium. The main drawback of glycols is linked to their recovery after contamination by the salts present in the fluid, with the operating costs entailed.

Another goal of the invention is recovery and reclamation of certain oil chemistry residues obtained during the manufacture of certain products intended for food production. In particular, it is advantageous to reclaim residues containing a majority proportion of glycerol and its polyalkyl derivatives, even though they are usually contaminated with organic acids and inorganic salts.

In order to formulate the inhibitor additive, the effect on the water activity of a large number of products and their combinations was measured using a calorimetric method: measuring the drop in the melting point of ice in a solution at atmospheric pressure. This is because we know that this drop is proportional to the inhibiting effect, defined as the difference between the hydrate dissociation temperature in pure water and in the inhibited solution. It will also be noted that the inhibiting effect is always less than the cryoscopic melting point depression for a given solute concentration. These measurements enabled various products and various combinations with useful inhibiting effects to be selected. There was particular interest in the synergistic effects obtained when at least two additives were combined.

Here, the term "useful effect" is a relative concept depending on the effect of the three most-used thermodynamic inhibitors: sodium chloride, methanol, and monoethylene glycol; there is particular interest in comparing the effects obtained with monoethylene glycol and the invention, in order to replace the former inhibitor additive formulations. The comparison is done for equal proportions by weight in the solution. Among the oil-chemistry residues referred to above, this work has shown that one of them, hereinafter called R, has a useful effect on the activity of water, which can even be of the same order of magnitude as that of monoethylene glycol.

R is a residue containing monoethylene glycol (10% to 50%), diglycerol (15% to 32%), triglycerol (about 5% to 10%), and other polyglycerols (traces less than 5%). The degree of polymerization of the glycerol mixture must remain small, preferably less than 2. Other organic compounds can be present in a smaller proportion (less than 10%), particularly organic acid salts. R can also contain inorganic salts, with a total percentage by weight of up to 45% but preferably between 20% and 30%. These salts are generally sodium salts, preferably sodium chloride, but also sodium phosphate and sodium nitrate. Finally, water can be found in proportions by weight of up to 15%.

The present invention can be comprised of the residue referred to combined with salts that can be inorganic or carboxylic acid salts. Of the inorganic salts, chlorides may be used, preferably sodium chloride, but also calcium chloride, magnesium chloride, or potassium chloride.

Carboxylic acid salts are already used in drilling fluid formulations, but essentially to change their density. These salts have the major advantage of low corrosiveness. Some of these salts are used in the food industry to lower the activity of water in food, preservation of which requires a moisture level termed "intermediate." Their use in thermodynamic inhibition of gas hydrates in drilling fluids is of major interest because, on the one hand, they are environmentally benign and, on the other hand, their inhibiting effect is among the highest (higher than that of monoethylene glycol, for example). This is due to a combination of:
- a polar effect, due to the presence of one or more hydroxyl groups; and
- an ionic effect, due to dissociation of the salt and formation of one or more cations and one or more COO⁻ ionic groups.

According to the present invention, the inhibitor can contain an alkaline salt of a carboxylic acid, preferably a salt containing at most three carbon atoms in the main chain. In general this is a formate, an acetate, or a lactate. Preferably, a sodium salt will be used, but calcium, cesium, or potassium salts can also be used. Thus, sodium acetate or formate will preferably be used in the inhibitor additive formulation, but other carboxylic salts can be used.

The 20% cryoscopic depression of some of the additives used in the formulation of our invention is presented in Table 1 below, where the cryoscopic depressions (K in ordinate) of reference substances can be compared with equal percentages by weight; R1 and R2 correspond to two different formulations of the oil-chemistry residue referred to above. R1 contains monoglycerol (12%-18%), diglycerol (25%-20%), triglycerol (about 5%), and other polyglycerols in a smaller proportion (traces, less than 1%); R1 also contains sodium chloride, phosphate, and sulfate in a total proportion by weight of about 45%. Finally, R1 also contains water (10%-15%) and various other organic materials (10%). R2 is a mixture of polyglycerols containing mainly monoglycerol (50%-55%), diglycerol (28%-32%), and triglycerol (10%-12%). R2 also contains other polyglycerols such as tetra- or pentaglycerol (or higher polyglycerols) in a total percentage by weight of less than 5%.

TABLE 1

| Reference Substances | Cryoscopic Depression (K) |
| --- | --- |
| R1 | 7.5 |
| R2 | 2.4 |
| Sodium lactate | 9.8 |
| Sodium acetate | 12.5 |
| Sodium formate | 11.8 |
| Glycerol | 5.6 |
| Monoethylene glycol | 7.8 |
| Methanol | 14.8 |
| Sodium chloride | 16.6 |

It will be noted in particular that formulation R1 has approximately the same cryoscopic depression as monoethylene glycol, and that formulation R2 has, a priori, a lower cryoscopic depression than the other compounds. On the latter point, the synergistic effects of formulation R2, which nonetheless is of definite interest, will be described.

In the formulation, the possible synergistic effects when at least two of the compounds or mixtures referred to above are combined will be taken into account. Some studies have shown synergistic effects when certain combinations are used; this has already been mentioned in U.S. Pat. No. 5,076, 364, where the glycerol/sodium chloride pair has effects identified by the applicants as synergistic with respect to thermodynamic inhibition of hydrates. In the same way, the sodium chloride/sodium lactate pair seems to have a synergistic effect in lowering the activity of water in foods (S. Guilbert, O. Clément, J. Cheftel, 1981; Comparative efficiency of $a_w$ depressants in solution and in food at intermediate humidity; *Lebensmittel Wissenschaft und Technologie,* 14(5):245-251). The widespread and somewhat empirical approach to identifying the synergistic effect of a pair A/B of solutes consists of measuring the individual effect of these solutes $\Delta T_A$ and $\Delta T_B$ for percentages by weight $x_A\%$ and $x_B\%$, and comparing the sum of these effects $\Delta T_A + \Delta T_B$ to the effect obtained by combining A and B in the same proportions, noted $\Delta T_{A+B}$. If the latter is equal to the sum of the two former, there is no interaction; if in absolute values it is larger than the sum of the first two, we speak of a synergistic effect; otherwise, it is an antagonist effect. A more rigorous approach based on calculating the activity of water can be used since, in the absence of an interaction between A and B, the activity of water in the water+A+B solution is given by:

$$a_{w,A+B} = a_{w,A} a_{w,B}$$

And we can then define the interaction factor:

$$\alpha_{A+B} \frac{a_{w,A+B}}{a_{w,A} a_{w,B}}$$

If this factor is less than 1 we can rigorously talk about a synergistic effect. This method has been used with different formulations, enabling the combinations with the most significant synergies to be identified. The interaction factors corresponding to solutions with proportions by weight 10% A+10% B are presented in Table 2:

TABLE 2

| Water + 10% A + 10% B Solutions | Interaction Factor |
| --- | --- |
| R1 + NaCl | 0.97 |
| R1 + SF | 0.98 |
| R1 + SA | 0.98 |
| R2 + NaCl | 0.97 |
| R2 + SF | 0.99 |
| NaCl + MEG | 0.97 |
| NaCl + G | 0.98 |

(Note: the further this factor is below 1, the greater the synergy)
SA = sodium acetate;
SF = sodium formate;
MEG = monoethylene glycol;
G = glycerol.

Table 2 shows that the synergistic effects obtained with the formulations involved in our invention can be of the same order of magnitude, or even better than the synergies observed in more-classical formulations. In particular we note the remarkable synergistic effect obtained by combining the R2 formulation with salts. This is probably due to the interaction of the mono- and polyglycerol molecules with the ionic species. These species could avoid polymerization of R2 molecules, hence greater availability of hydrophilic sites and greater lowering of the activity of water. Note also that the R1+salt combinations exhibit synergy of the same order, or better, than the synergy observed in the sodium chloride+ glycerol or sodium chloride+monoethylene glycol formulations.

Examples of formulations and inhibiting effect obtained in the presence of methane:

The selection of formulations R1 and R2 as well as their combinations with salts to formulate a thermodynamic inhibitor additive has only covered the effect of these products on lowering the theoretical freezing point of water (cryoscopic depression). The calorimetric method proposed by one of the applicants (FR2820823 and U.S. Pat. No. 0,134,146) was then used to study the effect obtained on the theoretical conditions for formation of methane hydrates.

The protocol used is the following: a sample of a few milligrams of the water+additive model solution is placed in a cell to which a pre-established methane pressure is applied. The temperature of the system is then lowered sufficiently to obtain hydrate formation. Finally, monitoring the thermal behavior of the sample during the heating step enables the dissociation temperature and pressure to be measured.

Table 3 shows the individual inhibiting effect obtained for an additive proportion by weight of 20% in the presence of methane and for an initial pressure of 300 bars. If the theoretical hydrate formation temperatures at 300 bar in pure water and in the inhibited solution respectively are noted $T_{fw}$ and $T_{fs}$, the value shown in Table 3 as a function of the additive is the inhibiting effect $\Delta T = T_{fw} - T_{fs}$.

TABLE 3

| Water + 20% A Model Solutions | Inhibiting Effect at 300 bars ΔT(K) |
|---|---|
| R1 | 7 |
| R2 | 3 |
| NaCl | 11 |
| Methanol | 10 |
| Monoethylene glycol | 4 |
| Glycerol | 6 |

It will be noted that formulation R1 has a fairly high inhibiting effect, higher than the effects of MEG. This effect can however vary according to the salt content of this product, but in general its inhibiting effect can be considered as being of the same magnitude as the individual effect of MEG. As for formulation R2, its effect is one of the smallest, probably due to the presence of molecules with a relatively high molecular weight relative to the other substances (monoglycerol itself has a molar mass of 93 g/mol).

Tables 4 and 5 show the inhibition synergies measured in the presence of methane at 300 bars in different model solutions, at higher proportions by weight that are closer to the actual concentrations of additives in water-based muds. The theoretical reduction in hydrate formation temperature obtained by combining products A and B, $\Delta T_{A+B}$, is compared to the sum of the reductions obtained using A or B alone, noted $\Delta T_A + \Delta T_B$.

FIG. 4 shows the synergies obtained at 300 bars in the R1+NaCl and R2+NaCl systems; the proportion by weight of salt was kept constant and equal to 15 wt. %; the model solutions were prepared with 10 wt. % and 20 wt. % concentrations of R1 and R2.

TABLE 4

| Water + X % A + 15% NaCl Solutions | $\Delta T_{A+B}$(K) |
|---|---|
| 10% R1 | 15.3 |
| 20% R1 | 13.7 |
| 20% R2 | 4.1 |

The synergies obtained with formulation R1 are fairly substantial, probably because of interactions between the ionic species present in the product and the ions coming from NaCl dissociation in the solution. It will be noted that these absolute gains are greater than the individual inhibiting effects presented in Table 3. Formulation R2 has far lower synergistic gains, but the combination R2(20%)+NaCl(15%) is nonetheless of interest as the only synergistic effect is, for example, comparable to the individual effect of 20 wt. % glycerol.

Table 5 shows the synergies obtained at 300 bars in R1+sodium formate and R2+sodium formate systems; the proportions by weight of salt and R1 and R2 are 15% and 20%, respectively.

TABLE 5

| Water + X % A + 15% Sodium Formate Solutions | $\Delta T_{A+B}$(K) |
|---|---|
| 20% R1 | 16.4 |
| 20% R2 | 3.7 |

The synergistic effects of Table 5 are somewhat remarkable for the system with water+R1+SF, where the absolute gain reaches 16.4 K. For R2, synergistic effects of the same order of magnitude as those observed with NaCl are found, ranging from 2 to 4K. For the R2+SF combination, overall the synergistic gains are comparable to those that could be obtained with conventional additives which however have the drawbacks described above.

Table 6 shows the synergies with respect to cryoscopic depression, and not inhibition of gas hydrates, observed in water, R2, and salt solutions. These values show the synergistic effect that can also be expected for gas hydrate inhibition. It is interesting to compare these systems to the classical water+10% NaCl+10% MEG system, whose cryoscopic depression ΔT is 3.1. Note that as a general rule synergies of the same order of magnitude are obtained with the other combinations, particularly with the R2+sodium lactate system, which has greater synergy.

TABLE 6

| Water + 10% R2 + 10% A Solutions A | $\Delta T_{R2+A}$(K) |
|---|---|
| NaCl | 2.7 |
| Sodium acetate | 4.15 |
| Sodium lactate | 3.8 |
| Sodium formate | 2.7 |

Table 7 shows the synergies with respect to cryoscopic depression, not inhibition of gas hydrates, observed in water, R2, and sodium formate solutions with 10 and 20 wt. %.

TABLE 7

| Water + 10% R2 + A % Sodium Formate Solutions A | $\Delta T_{R2+A}$(K) |
|---|---|
| 10% | 2.7 |
| 20% | 4.1 |

The invention claimed is:

1. An additive that inhibits formation of gas hydrates for water-based drilling fluid, said additive having at least the following constituents (weight percent):
    an oil-chemistry residue obtained during a food production process comprising a mixture A of glycerol derivatives having 10 to 55% monoglycerol, 15 to 32% diglycerol, and 5 to 12% triglycerol;
    0 to 10% of at least one carboxylic acid salt; and
    0 to 45% of at least one inorganic salt.

2. The additive according to claim 1, wherein mixture A has monoglycerol, diglycerol, and triglycerol in the following respective proportions: 12 to 18%, 15 to 20%, about 5%.

3. The additive according to claim 1, wherein mixture A has monoglycerol, diglycerol, and triglycerol in the following respective proportions: 50 to 55%, 28 to 32%, and 10 to 12%.

4. The additive according to claim 1, wherein mixture A has polyglycerols with molecular weights greater than 372 g/mol at concentrations by weight of less than 5%.

5. The additive according to claim 1, wherein said additive includes carboxylic acid salt and said carboxylic acid salt is a sodium or potassium salt with a short carbon chain.

6. The additive according to claim 5, wherein said sodium or potassium salt is a formate, an acetate or a lactate.

7. The additive according to claim 1, wherein said additive includes inorganic salt and said inorganic salt is a sodium salt.

8. The additive according to claim 7, wherein said sodium salt is a chloride, a nitrate or a sulfate.

9. A method of inhibiting gas hydrate formation for a water-based drilling fluid, comprising adding an aqueous solution of additive according to claim 1 to said drilling fluid.

10. The additive according to claim 1, wherein said additive includes said at least one carboxylic acid salt in an amount to provide a synergistic effect with respect to cryoscopic depression.

11. The additive according to claim 1, wherein said additive includes said at least one inorganic salt in an amount to provide a synergistic effect with respect to cryoscopic depression.

* * * * *